United States Patent

[11] 3,578,363

[72] Inventors Donald E. De Rocker
 Ramsey;
 Andrew J. Vaccaro, Little Falls, N.J.
[21] Appl. No. 819,917
[22] Filed Apr. 28, 1969
[45] Patented May 11, 1971
[73] Assignee Sier-Bath Gear Co, Inc.
 Bergen, N.J.

[54] LOCKING KEY FOR COUPLING
 9 Claims, 8 Drawing Figs.
[52] U.S. Cl. .................................................. 287/52.05,
 287/53
[51] Int. Cl. ..................................................... F16d 1/06
[50] Field of Search........................................... 287/52.05,
 52.09, 53 (LK), 53 (TK), 52.08; 64/9

[56] References Cited
 UNITED STATES PATENTS
1,408,993 3/1922 Eberhardt .................... 287/52.08X
1,487,627 3/1924 Tuten ............................ 287/52.08X
2,909,045 10/1959 Burns ........................... 64/9
3,222,884 12/1965 Lyle .............................. 287/52.05X
3,315,993 4/1967 Church......................... 287/52.05
3,404,907 10/1968 Kane et al..................... 287/52.05
 FOREIGN PATENTS
1,216,965 12/1959 France ......................... 287/52.09

Primary Examiner—David J. Williamowsky
Assistant Examiner—Andrew V. Kundrat
Attorney—Howard C. Miskin ABSTRACT: A rotatable coupling includes a sleeve engaging a shaft having an end provided with opposite parallel flats, which end is received in the bore of the sleeve. The sleeve has a recess in its inner face with a flat base at a transverse angle to the confronting shaft flat and a wedge-shaped key is located in the recess with opposite converging faces engaging the shaft flat and recess base. Screws accessible externally of the sleeve engage tapped traverse bores communicating with the recess and bear on opposite ends of the key to permit its transverse adjustment. The opposite shaft flat is engaged by a confronting flat on the sleeve. A compression spring urges the key toward the deep side of the recess.

Patented May 11, 1971
3,578,363
3 Sheets-Sheet 1
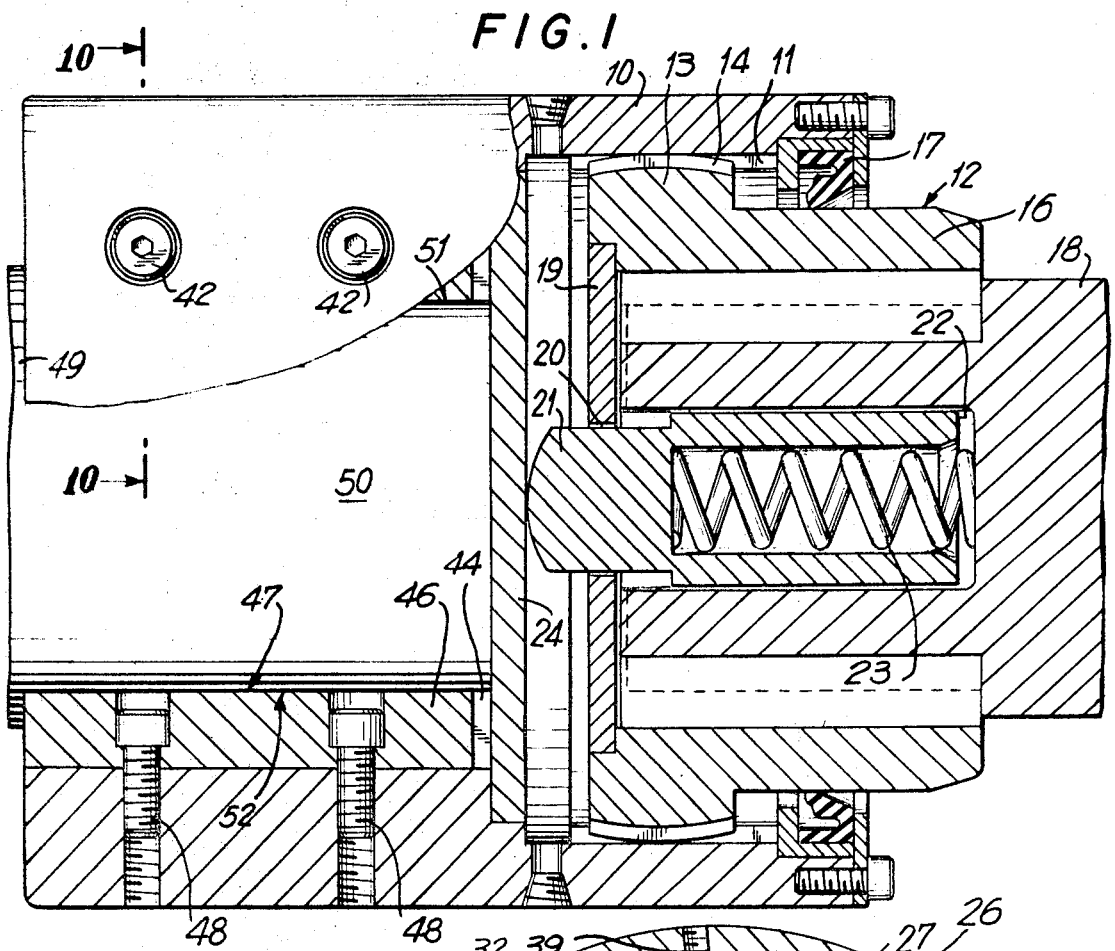
FIG.1
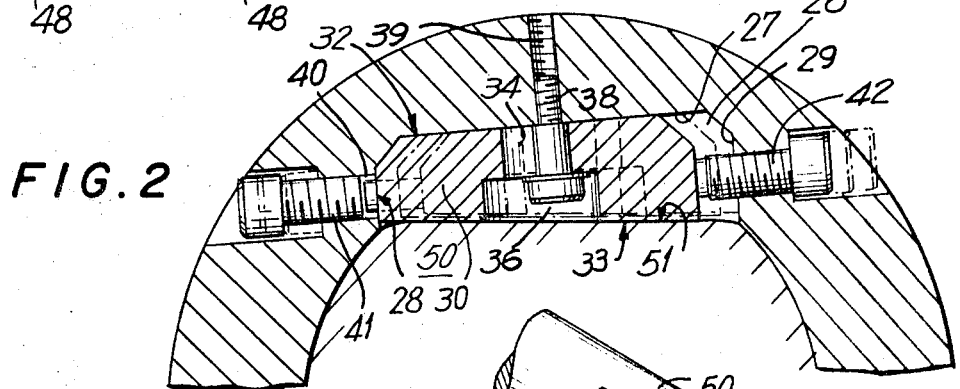
FIG.2
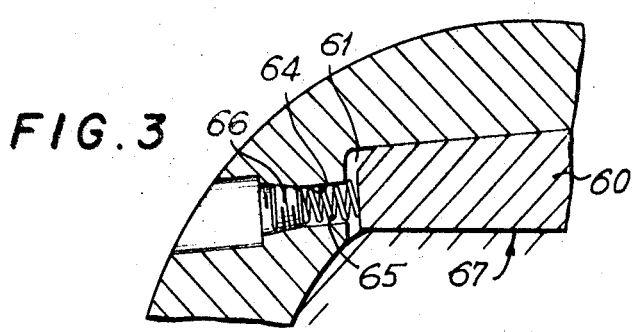
FIG.3
FIG.1a
INVENTORS
DONALD E. DE ROCKER
ANDREW J. VACCARO
BY Howard C. Miskin
ATTORNEY

INVENTORS
DONALD E. DE ROCKER
ANDREW J. VACCARO

BY Howard C. Miskin

ATTORNEY

Patented May 11, 1971
3,578,363
3 Sheets-Sheet 3
FIG.6
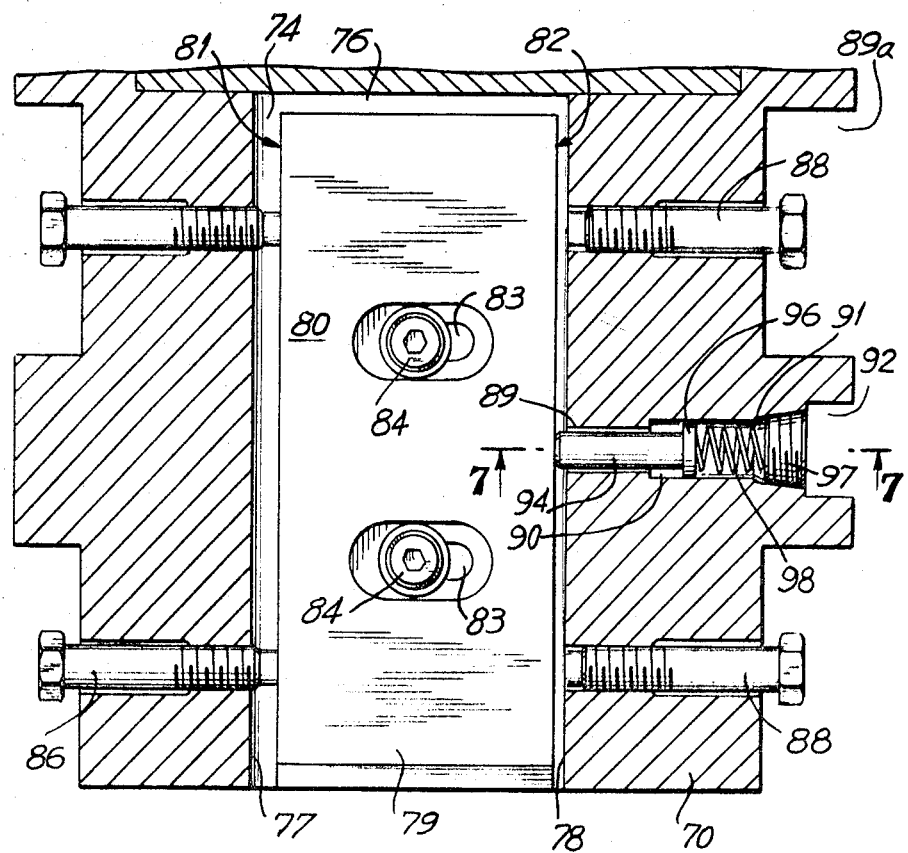
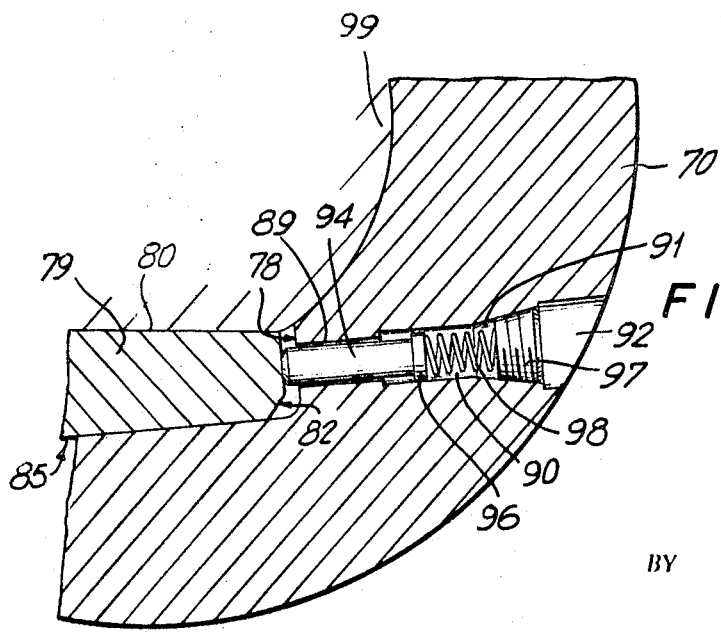
FIG.7
INVENTORS
DONALD E. DE ROCKER
ANDREW J. VACCARO
BY
Howard C. Miskin
ATTORNEY

LOCKING KEY FOR COUPLING

BACKGROUND OF THE INVENTION

The present invention relates generally to improvements in power and motion transmission couplings and it relates more particularly to an improved quick-connect-disconnect rotary drive coupling especially useful in steel mills or rollings mills.

There are many machines and devices which require a direct connection to a rotary device in which it is frequently necessary to disconnect and reconnect the drive from the driven member. Many of these machines, for their proper operation and maintenance, require a highly secure drive connection even under high loading conditions. The couplings heretofore employed, as typified by the use of a longitudinal key mating with confronting slots in coupled shaft and sleeve, possess numerous drawbacks and disadvantages. The connection and disconnection of the coupling members are difficult and time consuming, requiring a high degree of skill, and these devices otherwise leave much to be desired.

SUMMARY OF THE INVENTION

It is a principal object of the present invention to provide an improved drive coupling.

Another object of the present invention to provide an improved rotating drive coupling, which may be easily and rapidly connected and disconnected.

Still another object of the present invention is to provide a rapid disconnect and connect rotary drive coupling, which is highly secure even under high loading conditions.

A further object of the present invention is to provide a device of the above nature, which is rugged, reliable, highly adaptable and requiring a minimum of skill in its use.

The above and other objects of the present invention will become apparent from a reading of the following description taken in conjunction with the accompanying drawings, which illustrate preferred embodiments thereof.

The present invention contemplates the provision of a coupling assembly, comprising a coupling member including a longitudinal bore engaging a shaft, said coupling member and said shaft having first flats on confronting inner and outer faces respectively thereof converging in a transverse direction at a predetermined angle, a key member positioned between said first flats and having second flats converging at said predetermined angle and parallel to said first flats, and means for transversely adjusting the position of said key member relative to said first flats.

In a preferred form of the improved coupling, the coupling member includes a sleeve or collar, which engages a shaft section having diametrically opposite parallel flats. A well is formed in the inside face of the sleeve confronting one of the shaft flats and has a flat base forming a predetermined angle with the shaft flat and the wedge-shaped key rests in the well and is transversely slideable along its base. Adjusting screws engage tapped transverse bores in the sleeve and bear on opposite ends of the key to permit the transverse adjustment thereof and the locking and unlocking of the coupling members. The opposite shaft flat is engaged by a parallel flat in the sleeve. Advantageously, springs or spring-urged members bear on the narrow end of the key resiliently urging it toward its unlock condition.

The coupling may be rapidly connected to the shaft and disconnected, since they may be easily tightened or loosened merely by the turning of the screws which is readily accomplished in a minimum of time. The coupling is secure even under high loading conditions and is self-locking by the rotation of the drive member in a proper direction relative to the key orientation. The coupling device is rugged, simple and reliable.

BRIEF DESCRIPTION OF THE DRAWINGS

FIG. 1 is a partial longitudinal sectional view of a drive coupling embodying the present invention;

FIG. 1a is a perspective view of the end of the coupled shaft;

FIG. 2 is a sectional view taken along line 2–2 in FIG. 1;

FIG. 3 is a view similar to FIG. 2 of a modification of the structure illustrated therein;

FIG. 6 is a sectional view taken along line 6–6 in FIG. 5; and

FIG. 7 is a sectional view taken along line 7–7 in FIG. 6.

DESCRIPTION OF THE PREFERRED EMBODIMENTS

Figure 4:
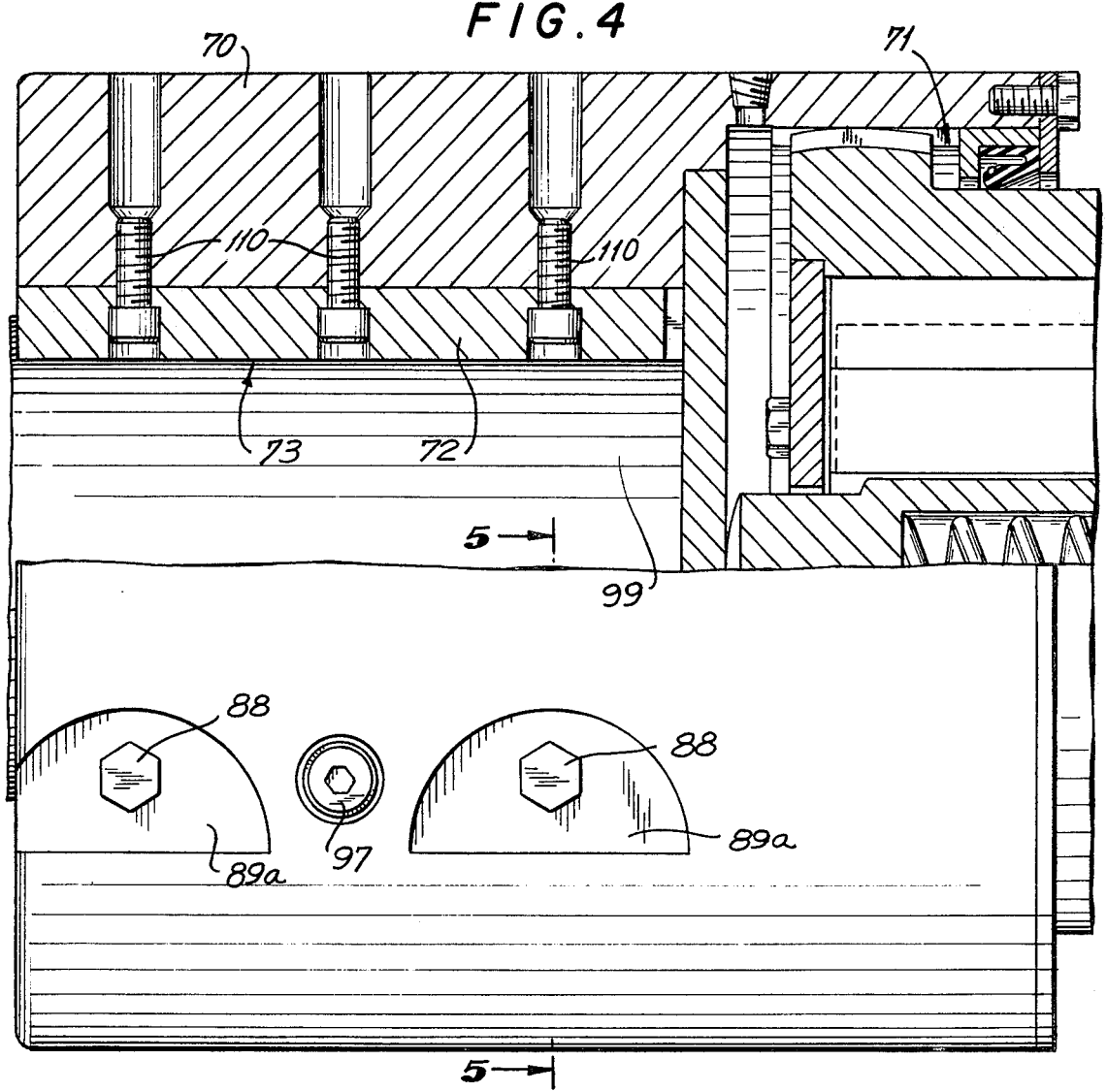
FIG. 4 is a partial longitudinal sectional view of another embodiment of the present invention.

Referring now to the drawings, and particularly FIGS. 1 and 2 thereof, which illustrate a preferred embodiment of the present invention as applied to the quick-connect and disconnect of a shaft to a flexible coupling, the reference numeral 10 generally designates a coupling sleeve which is provided at one end thereof, forming part of a conventional flexible coupling, with internal longitudinal splines 11. A hub 12 projects into the corresponding end of the sleeve 10 and includes an enlarged inner head section 13 provided with arcuately shaped teeth 14, which interdigitate with splines 11, so that the sleeve 10 and hub 12 rotate in unison, but the hub 12 is universally swingable relative to sleeve 10. The outer section 16 of hub 12 is spaced from the inner face of sleeve 10 and is sealed thereto by a suitably mounted flexible ring seal 17 positioned at the end of sleeve 10.

A shaft 18 registers with and is keyed to hub 16 and a retainer plate 19 is secured to the inner end of hub 12 and is provided with a central circular aperture 20. A thrust bottom 21 having an arcuate end face nests in an axial well 22 in the inner end of shaft 18 and is resiliently urged outwardly through aperture 20 by a compression spring 23 housed in a well in the inner end of button 21 and bearing on the base of well 22. The curved outer end of button 21 bears on a thrust plate 24 secured in the sleeve 10 intermediate its ends.

The inside face of sleeve 10 opposite the flexible coupling end thereof is a smooth-faced cylindrical surface coaxial with the sleeve 10, and has a longitudinally extending transverse recess or channel 26 formed therein delineated by a flat defining planar base face 27 and relative lower and higher longitudinal end faces 28 and 29, respectively. The plane of face 27 forms an acute wedge angle with the plane containing the lines of intersection of end faces 28 and 29 with the inner face of sleeve 10, which plane is along a chord of said inner face.

A wedge-shaped locking or key member 30 is positioned in and is of lesser width than the recess 26 and extends along the length thereof. Key member 30 includes a flat defining outer face 32 slideably engaging the recess base face 27 and a flat defining inner face 33 parallel to the chord defined by the plane containing the inner edges of recess 26, so as to form an angle to face 32 equal to that between base face 27 and said chord-defining plane. Thus, transverse sliding of key member 30 in recess 26 effects a radially inward or outward movement of flat 33 while maintaining it parallel to itself. A pair of longitudinally spaced parallel transverse slots 34 are formed in key member 30 and are enlarged as at 36 along the inner face of key member 30. A pair of bolts or screws 38 engage slots 34 and aligned tapped bores 39 formed in sleeve 10, the heads of screws 38 resting in enlarged slot sections 36 and slideable retaining key member 30 in transverse sliding engagement with flat 27.

Formed in sleeve 10 are longitudinally spaced pairs of transversely aligned tapped bores 40 having enlarged outer counterbores and communicating with recess 26 through faces 28 and 29. Adjusting screws 41 and 42 are threadedly received in each of the bores 40 and bear respectively on the confronting low and high key member end walls and are provided with heads which nest in the counterbores. Thus by advancing screws 41 and retracting screws 42 key member 30 moves to the right, as viewed in FIG. 2, to move flat 33 radially outwardly, and by retracting screws 41 and advancing screws 42, key member 30 moves to the left to move flat 33 radially inwardly.

A longitudinal channel 44 is formed in the inner face of sleeve 10 diametrically opposite to the medial longitudinal axis of recess 26 and has nested therein a longitudinal rectangular bar 46. Bar 46 has a flat 47 parallel to flat 33 and radially inside the cylindrical plane of the sleeve inner face. A pair of screws 48 secure the bar 46 in channel 44.

A shaft 49 includes an end section 50 telescoping within sleeve 10, with end section 50 having an outside diameter slightly less than the inside diameter of sleeve 10. As seen best in FIG. 1a, diametrically opposed parallel flats 51 and 52 are formed in the shaft end section 50, and when in a locked coupled condition with sleeve 10, abut and are tightly embraced by flats 33 and 47, respectively.

Considering now the operation of the improved coupling assembly described above, in effecting a coupling, shaft end section 50 is inserted into sleeve 10 with flats 51 and 52 confronting flats 33 and 47, respectively. Screws 42 and 41 are respectively retracted and advanced to sufficiently retract flat 33 to allow proper clearance for easy assembly of the shaft end into the bore of the sleeve. Thereafter, screws 41 are turned to retract them and screws 42 are turned to advance them so as to shift key member 30 to the left and advance flat 33 radially inwardly until the shaft section 50 is tightly clamped between flats 33 and 47 engaging and embracing shaft flats 51 and 52. Uncoupling is readily achieved by retracting screws 42 and advancing screws 41 to shift key member 30 to the right and retract flat 33 radially outwardly.

The movement of key member 30 may be effected or facilitated by the structure illustrated in FIG. 3. Key 60, which corresponds to key 30 described above, is located in a recess 61 in sleeve 63, which are constructed as above set forth and have the various other elements associated therewith in a like manner. In addition, a transverse bore 64 is formed in sleeve 63 and communicates with the shallow face of recess 61. A compression spring 65 is housed in bore 64 and is entrapped between the low end face of key member 60 and a screw plug 66 closing the outer end of bore 64 to urge key member 60 to the right as viewed in FIG. 3, and retract the inner flat 67 thereof. Thus, uncoupling may be effected merely by loosening screws 42, the spring 65 functioning to cause the key member 60 to follow screws 42.

Figure 5:
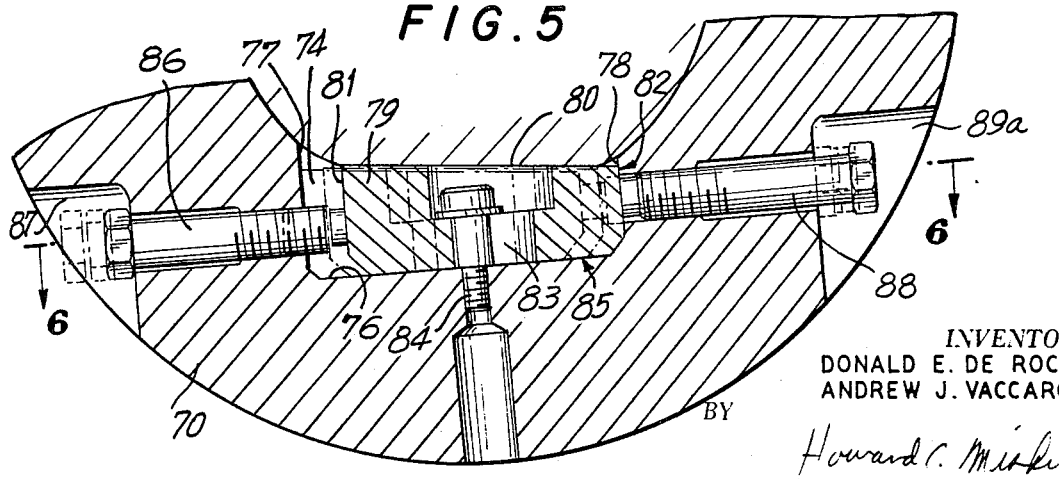
FIG. 5 is a sectional view taken along line 5–5 in FIG. 4.

Referring now to FIGS. 4 to 7 of the drawing, which illustrate another embodiment of the present invention, the reference numeral 70 designates a coupling sleeve, the right side of which has associated therewith a gear-type flexible coupling assembly 71 of the nature of the flexible coupling assembly of the first described embodiment.

Formed in the inner face of sleeve 70 is a longitudinal channel which receives a longitudinally extending rectangular bar 72 having an inner flat face 73 lying radially inwardly of the cylindrical plane of the bore of sleeve 70. Bar 72 is secured in position by a plurality of screws 110 engaging tapped radial bores in sleeve 70, and counterbored openings in bar 72 aligned with said tapped radial bores.

A longitudinal channel or recess 74 is formed in the inside face of sleeve 70 and has a longitudinal medial axis diametrically opposite the longitudinal medial axis of flat 73 and a base face 76 lying in a plane which transversely converges with the plane of flat 73. Recess 74 is bounded by relatively high and low longitudinal end walls 77 and 78, respectively.

Located in, and of lesser width than, channel 74 is a key member 79 of rectangular transverse cross section. The key member 79 includes a flat defining inner face 80 opposing and parallel to flat 73 and an outer face 85 slideably engaging channel base face 76 and lying in a plane converging with the plane of flat 80. Key member 79 includes a longitudinal high end face 81 confronting and parallel to channel end face 77, and a longitudinal low end face 82 confronting and parallel to channel end face 78. A pair of longitudinally spaced transverse slots 83 are formed in key member 79 and are enlarged at face 80. Screws 84 register with slots 83 and engage tapped bores in sleeve 70 and have heads positioned in the enlarged sections of slots 83 and function to transversely slideably retain key member 79 in channel 74.

A first pair of longitudinally spaced cap screws 86 engage corresponding tapped transverse bores in sleeve 70 and have inner ends bearing on key face 81, and hex heads located in recesses 87 in the outer face of sleeve 70. A second pair of longitudinally spaced cap screws 88 engage corresponding tapped transverse bores in sleeve 70 and have inner ends bearing on key face 82, and hex heads located in recesses 89a in the outer face of sleeve 70.

Formed in the sleeve 70 intermediate of cap screws 88 is a transverse bore 89 extending to channel face 78 and provided with an enlarged coaxial outer section 90, terminating in a tapped conical section 91 communicating with a coaxial recess 92 in the outer face of sleeve 70. A rod 94 slideably registers with bore 89 and includes an enlarged head 96 slideably registering with bore 90. A threaded plug 97 engages tapped bore 91 and a helical compression spring 98 is entrapped between head 96 and plug 97 to resiliently urge rod 94 against key member face 82, whereby to urge the key member 79 toward the left, as viewed in FIG. 5, and retract flat 80 radially outwardly.

A shaft 99, similar to the shaft 49 of the first-described embodiment, is connected to the improved coupling last described, with the shaft coupled end being provided with diametrically opposed flats. The operation of the improved coupling illustrated in FIGS. 4 to 7 is similar to that first described. It should be noted that, if desired, once a coupling has been effected, release can be achieved by retracting the screws 86, the spring-loaded rod 94 pushing key member 79 to an unlock position, the screws 88 being employed as guide stops, or in the event the spring force is insufficient, merely to break the initial engagement between the flat 80 and the shaft flat, the spring-loaded rod taking over from there.

While threaded bolts were shown as the locking members for the keys, other means could be employed, such as cams, or spring-loaded fasteners.

While there have been described and illustrated preferred embodiments of the present invention, it is apparent that numerous alterations, omissions and additions may be made without departing from the spirit thereof. While the couplings described, did not specifically include the shafts that were being coupled, such as the driven and driving shafts, shafts could be part of the couplings such as in a spindle coupling.

We claim:

1. A coupling assembly connected to a shaft, comprising a coupling member including a longitudinal bore receiving an end of the shaft, said coupling member and said shaft end having first flats on the confronting inner and outer faces respectively thereof converging in a direction transverse and normal to the axis of the bore at a predetermined angle, a key member positioned between said first flats and having second flats converging at said predetermined angle and parallel to said first flats, and means for transversely adjusting the position of said key member relative to said first flats, including means resiliently urging said key member in a direction transverse to the axis of the bore, toward the wide end thereof.

2. The coupling assembly of claim 1, wherein said coupling member and said shaft end have mutually engaging flats diametrically opposite and parallel to their corresponding first flats.

3. The coupling assembly of claim 1 wherein said coupling member has a recess formed in the inner face thereof exposed to said bore, and having a base defining a corresponding first flat, said key member registering with said recess and transversely adjustable along the base thereof with a second flat defining face engaging said base, the opposite second flat defining face of said key member projecting inwardly of the surface of said bore.

4. The coupling assembly of claim 3, wherein said coupling member has tapped transverse bores therein communicating with opposite sides of said recess and the outside surface of said coupling member, and said key member adjusting means comprises screws engaging said tapped transverse bores and adapted to bear on opposite ends of said key member.

5. The coupling assembly of claim 3, including means for retaining said key member in said recess.

6. The coupling assembly of claim 1, wherein said shaft has a third flat diametrically opposite and parallel to said first flat thereon, the coupling member having a recess formed therein opposing said third flat, and a bar registering with said second recess and having a flat parallel to and engaging said third flat.

7. The coupling assembly of claim 3, wherein said coupling member has tapped transverse bores therein communicating with opposite sides of said recess and the outside surface of said coupling member, and said key member adjusting means comprises screws engaging said tapped transverse bores and adapted to bear at least on the end of said key member opposing said resilient means.

8. A coupling assembly connected to a shaft, comprising a coupling member including a longitudinal bore receiving an end of the shaft, said coupling member and said shaft end having first flats on the confronting inner and outer faces respectively thereof converging in a direction transverse to the axis of the bore at a predetermined angle, said coupling member having a recess formed in the inner face thereof exposed to said bore and having a base defining a corresponding first flat, a key member positioned between said first flats and having second flats converging at said predetermined angle and parallel to said first flats, said key member registering with said recess and transversely adjustable along the base thereof with a second flat defining face engaging said base, and means for transversely adjusting the position of said key member relative to said first flats, said coupling member having tapped transverse bores therein communicating with opposite sides of and transverse to the flat of said recess and the outside surface of said coupling member, and said key member adjusting means comprising screws engaging said tapped transverse bores and adapted to bear on opposite ends of said key member, the coupling member and the shaft having mutually engaging flats diametrically opposite and parallel to said coupling member first flat, and including means retaining said key member in said recess, comprising said key member having a slot transverse to its longitudinal axis and passing therethrough and enlarged along the inner face of said key member, said slot being aligned with the transverse threaded bore in said coupling member, and a screw registering with the key slot and engaging the tapped bore with the head of the screw registering with the enlarged portion of said slot.

9. The coupling assembly of claim 8, wherein said coupling member has a transverse guide bore formed therein communicating with said recess and confronting the narrow end of said key member, and including a bar slideably registering with said guide bore, and spring means urging said bar toward said key member.